US012662243B2

(12) United States Patent
Foskey

(10) Patent No.: US 12,662,243 B2
(45) **Date of Patent: \*Jun. 23, 2026**

(54) DRAG REDUCING SPINNER FOR HIGH SPEED STOP FOLD ROTOR

(71) Applicant: Textron Innovations Inc., Providence, RI (US)

(72) Inventor: Christopher E. Foskey, Keller, TX (US)

(73) Assignee: Textron Innovations Inc., Providence, RI (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/752,939

(22) Filed: Jun. 25, 2024

(65) Prior Publication Data

US 2024/0343387 A1      Oct. 17, 2024

Related U.S. Application Data

(63) Continuation of application No. 17/390,513, filed on Jul. 30, 2021, now Pat. No. 12,030,623.

(51) Int. Cl.
| | |
|---|---|
| *B64C 27/30* | (2006.01) |
| *B64C 11/14* | (2006.01) |
| *B64C 29/00* | (2006.01) |
| *B64F 5/10* | (2017.01) |

(52) U.S. Cl.
CPC .............. *B64C 27/30* (2013.01); *B64C 11/14* (2013.01); *B64C 29/0033* (2013.01); *B64F 5/10* (2017.01)

(58) Field of Classification Search
CPC ...... B64C 11/14; B64C 27/30; B64C 29/0033
See application file for complete search history.

(56) References Cited

U.S. PATENT DOCUMENTS

| | | | | |
|---|---|---|---|---|
| 2,408,677 | A | 10/1946 | Morgan | |
| 2,742,096 | A | 4/1956 | Brady | |
| 2,924,282 | A | 2/1960 | Perryman | |
| 3,228,476 | A \* | 1/1966 | Brown | B64C 11/14 416/94 |
| 3,420,311 | A | 1/1969 | Davies et al. | |
| 4,699,568 | A \* | 10/1987 | Harlamert | B64D 15/12 416/155 |
| 4,957,415 | A | 9/1990 | Paul et al. | |
| 6,358,014 | B1 \* | 3/2002 | Chou | F02C 7/04 29/889.1 |
| 6,622,962 | B1 | 9/2003 | White | |
| 2015/0266571 | A1 | 9/2015 | Bevrt et al. | |
| 2016/0137296 | A1 \* | 5/2016 | Alfano | B64C 27/04 416/223 R |

(Continued)

*Primary Examiner* — William L Gmoser
(74) *Attorney, Agent, or Firm* — FBT Gibbons LLP

(57) ABSTRACT

A spinner is described that can provide aerodynamic advantages for vertical takeoff and landing (VTOL) aircraft. The spinner can be shaped with multiple faces divided by chines. The chines can run down the edge of the spinner to fairings that can cover rotor blades and/or couplings between rotor blades and the rotor hubs of the aircraft. During forward flight the rotor blades can be folded down into recesses on the spinner. The spinner and fairings can provide aerodynamic advantages in addition to protection for sensitive components within the rotor and blades apparatus. This improves efficiency and allows the aircraft to fly faster.

20 Claims, 13 Drawing Sheets

(56)           References Cited

U.S. PATENT DOCUMENTS

| 2016/0137297 | A1  |  5/2016 | Alfano et al. |
| 2017/0349265 | A1  | 12/2017 | McPhail et al. |
| 2018/0029692 | A1  |  2/2018 | Higbie et al. |
| 2018/0334240 | A1  | 11/2018 | Paulson et al. |
| 2019/0276142 | A1* |  9/2019 | Przybyla .............. B64C 11/28 |
| 2020/0223552 | A1  |  7/2020 | Foskey et al. |

\* cited by examiner

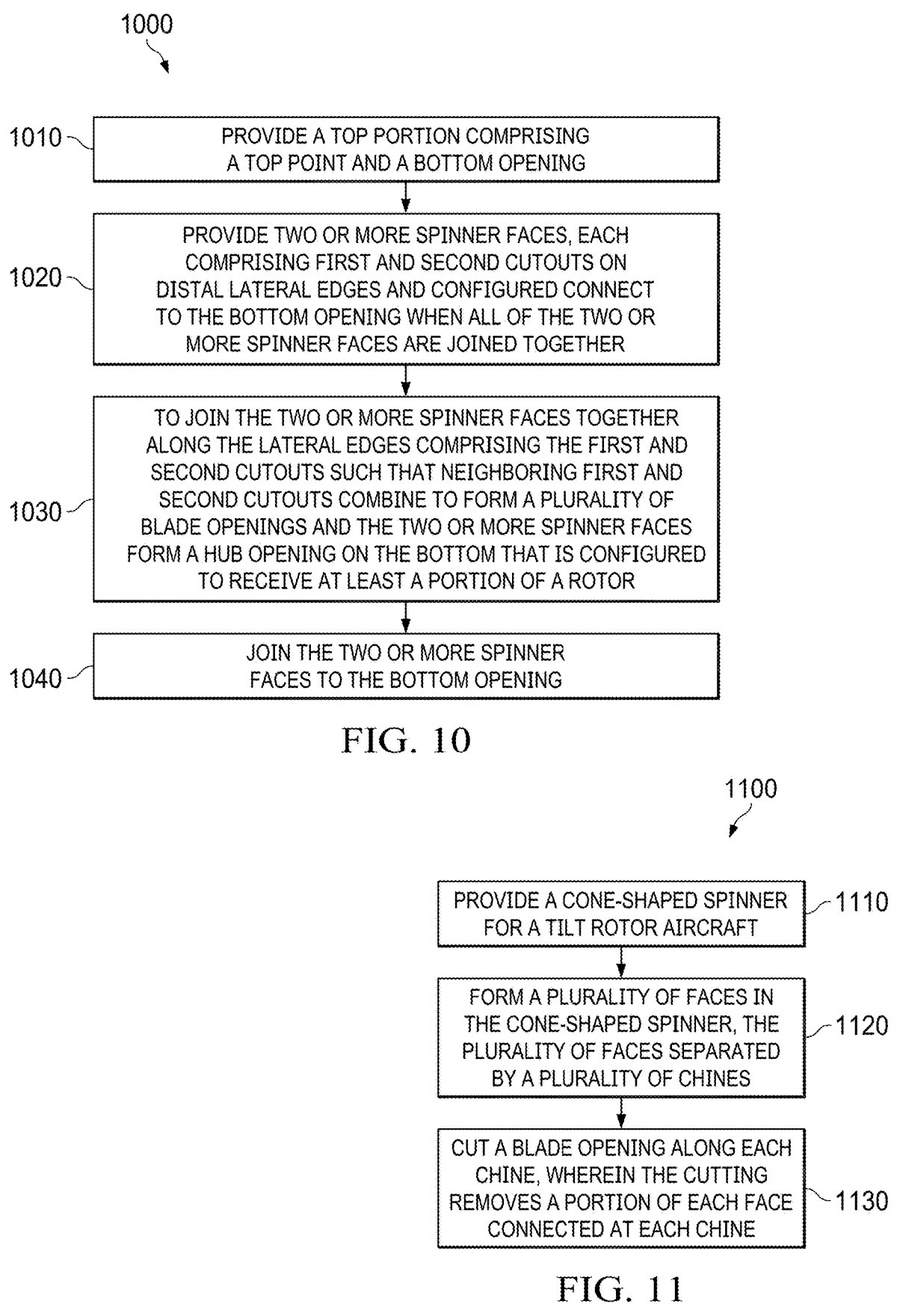

| 1010 | PROVIDE A TOP PORTION COMPRISING A TOP POINT AND A BOTTOM OPENING |
|---|---|

| 1020 | PROVIDE TWO OR MORE SPINNER FACES, EACH COMPRISING FIRST AND SECOND CUTOUTS ON DISTAL LATERAL EDGES AND CONFIGURED CONNECT TO THE BOTTOM OPENING WHEN ALL OF THE TWO OR MORE SPINNER FACES ARE JOINED TOGETHER |
|---|---|

| 1030 | TO JOIN THE TWO OR MORE SPINNER FACES TOGETHER ALONG THE LATERAL EDGES COMPRISING THE FIRST AND SECOND CUTOUTS SUCH THAT NEIGHBORING FIRST AND SECOND CUTOUTS COMBINE TO FORM A PLURALITY OF BLADE OPENINGS AND THE TWO OR MORE SPINNER FACES FORM A HUB OPENING ON THE BOTTOM THAT IS CONFIGURED TO RECEIVE AT LEAST A PORTION OF A ROTOR |
|---|---|

| 1040 | JOIN THE TWO OR MORE SPINNER FACES TO THE BOTTOM OPENING |
|---|---|

| PROVIDE A CONE-SHAPED SPINNER FOR A TILT ROTOR AIRCRAFT | 1110 |
|---|---|

| FORM A PLURALITY OF FACES IN THE CONE-SHAPED SPINNER, THE PLURALITY OF FACES SEPARATED BY A PLURALITY OF CHINES | 1120 |
|---|---|

| CUT A BLADE OPENING ALONG EACH CHINE, WHEREIN THE CUTTING REMOVES A PORTION OF EACH FACE CONNECTED AT EACH CHINE | 1130 |
|---|---|

FIG. 11

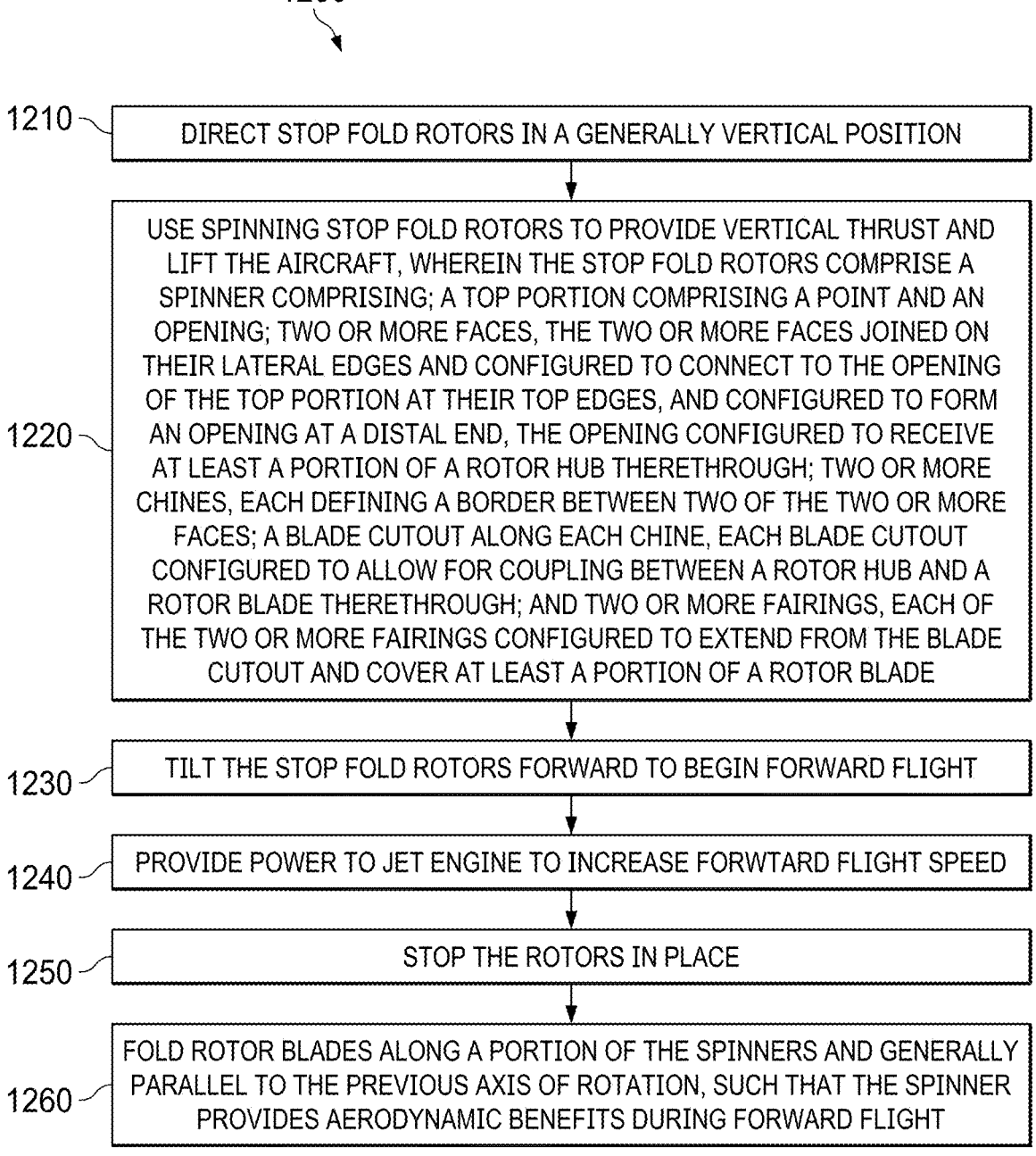

1200

1210 — DIRECT STOP FOLD ROTORS IN A GENERALLY VERTICAL POSITION

1220 — USE SPINNING STOP FOLD ROTORS TO PROVIDE VERTICAL THRUST AND LIFT THE AIRCRAFT, WHEREIN THE STOP FOLD ROTORS COMPRISE A SPINNER COMPRISING; A TOP PORTION COMPRISING A POINT AND AN OPENING; TWO OR MORE FACES, THE TWO OR MORE FACES JOINED ON THEIR LATERAL EDGES AND CONFIGURED TO CONNECT TO THE OPENING OF THE TOP PORTION AT THEIR TOP EDGES, AND CONFIGURED TO FORM AN OPENING AT A DISTAL END, THE OPENING CONFIGURED TO RECEIVE AT LEAST A PORTION OF A ROTOR HUB THERETHROUGH; TWO OR MORE CHINES, EACH DEFINING A BORDER BETWEEN TWO OF THE TWO OR MORE FACES; A BLADE CUTOUT ALONG EACH CHINE, EACH BLADE CUTOUT CONFIGURED TO ALLOW FOR COUPLING BETWEEN A ROTOR HUB AND A ROTOR BLADE THERETHROUGH; AND TWO OR MORE FAIRINGS, EACH OF THE TWO OR MORE FAIRINGS CONFIGURED TO EXTEND FROM THE BLADE CUTOUT AND COVER AT LEAST A PORTION OF A ROTOR BLADE

1230 — TILT THE STOP FOLD ROTORS FORWARD TO BEGIN FORWARD FLIGHT

1240 — PROVIDE POWER TO JET ENGINE TO INCREASE FORWTARD FLIGHT SPEED

1250 — STOP THE ROTORS IN PLACE

1260 — FOLD ROTOR BLADES ALONG A PORTION OF THE SPINNERS AND GENERALLY PARALLEL TO THE PREVIOUS AXIS OF ROTATION, SUCH THAT THE SPINNER PROVIDES AERODYNAMIC BENEFITS DURING FORWARD FLIGHT

FIG. 12

DRAG REDUCING SPINNER FOR HIGH SPEED STOP FOLD ROTOR

CROSS REFERENCE TO RELATED DATA

This application is a continuation of U.S. patent application Ser. No. 17/390,513, filed Jul. 30, 2021, titled Drag Reducing Spinner for High Speed Stop Fold Rotor, now U.S. Pat. No. 12,030,623, the contents of which are hereby incorporated herein in its entirety.

TECHNICAL FIELD

The present disclosure is directed to vertical takeoff and landing aircraft.

BACKGROUND OF THE INVENTION

Vertical takeoff and landing aircraft provide valuable maneuverability for civilian and military applications. These types of aircraft can provide the vertical capability of helicopters, eschewing the need for long runways for takeoff and landing. Furthermore, tilting the rotors forward during flight gives these aircraft some of the capabilities of conventional airplanes. Tilt rotor aircraft use their rotors for propulsion during forward flight. Stop fold rotor aircraft cease the rotation of the rotors as a source of propulsive energy and subsequently fold the rotor blades parallel to the pylon, replacing the thrust with that generated by a jet engine or other non-rotor means.

BRIEF SUMMARY OF THE INVENTION

One embodiment under the present disclosure comprises a spinner for a stop fold rotor aircraft, comprising: a top portion comprising a point and an opening; two or more faces, the two or more faces joined on their lateral edges and configured to connect to the opening of the top portion at their top edges, and configured to form an opening at a distal end, the opening configured to receive at least a portion of a rotor hub therethrough; two or more chines, each defining a border between two of the two or more faces; and a blade cutout along each chine, each blade cutout configured to allow for coupling between a rotor hub and a rotor blade therethrough.

Another embodiment under the present disclosure comprises a VTOL aircraft, comprising: a fuselage; a wing coupled to the fuselage; two or more stop rotors coupled to the wing, each stop rotor operable to provide vertical thrust when in a generally vertical orientation and further operable to be maneuvered to a generally horizontal direction during forward flight; a plurality of rotor blades coupled to each of the two or more stop rotors; and a spinner coupled to the top of each stop rotor, each spinner comprising: a top portion comprising a point and an opening; two or more faces, the two or more faces joined along their lateral edges so as to be coupled at their top with the opening of the top; two or more chines, each defining a border between two of the two or more faces; and a blade cutout along each chine, each blade cutout configured to allow for coupling between one of the two or more stop rotors and one of the plurality of rotor blades therethrough.

Another embodiment under the present disclosure comprises a method of manufacturing a spinner for a VTOL aircraft, comprising: provide a top portion comprising a top point and a bottom opening; provide two or more spinner faces, each comprising first and second cutouts on distal lateral edges and configured to connect to the bottom opening when all of the two or more spinner faces are joined together; join the two or more spinner faces together along the lateral edges comprising the first and second cutouts such that neighboring first and second cutouts combine to form a plurality of blade openings and the two or more spinner faces form a hub opening on the bottom that is configured to receive at least a portion of a rotor; and join the two or more spinner faces to the bottom opening.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 8 is a graph showing aerodynamic behavior under the present disclosure.

FIG. 10 is a method embodiment under the present disclosure.

FIG. 11 is a method embodiment under the present disclosure.

FIG. 12 is a method embodiment under the present disclosure.

DETAILED DESCRIPTION OF THE INVENTION

Vertical takeoff and landing (VTOL) aircraft typically comprise tilt rotor aircraft with tiltable or foldable rotors disposed on wings. The rotors can be vertically positioned for takeoff and landing, like a helicopter. During forward flight the rotors can be tilted forward to assist in propelling the aircraft forward. For many applications, there is a practical limit to the horizontal speed of VTOLs due to aeroelastic and myriad aerodynamic effects. Rotors and blades may only be capable of a specific maximum tip speed. Furthermore, with a conventional spinner designed with large openings for clearances for rotor motion, blade attachment, and hub and control hardware, may be exposed to the freestream resulting in large drag increases. These components can be susceptible to vibrations, aerodynamic interference, and other factors that can harm such components, and thereby limit speed. The embodiments disclosed herein include teachings for a stop fold rotor VTOL aircraft with increased speed capabilities.

Figure 1:
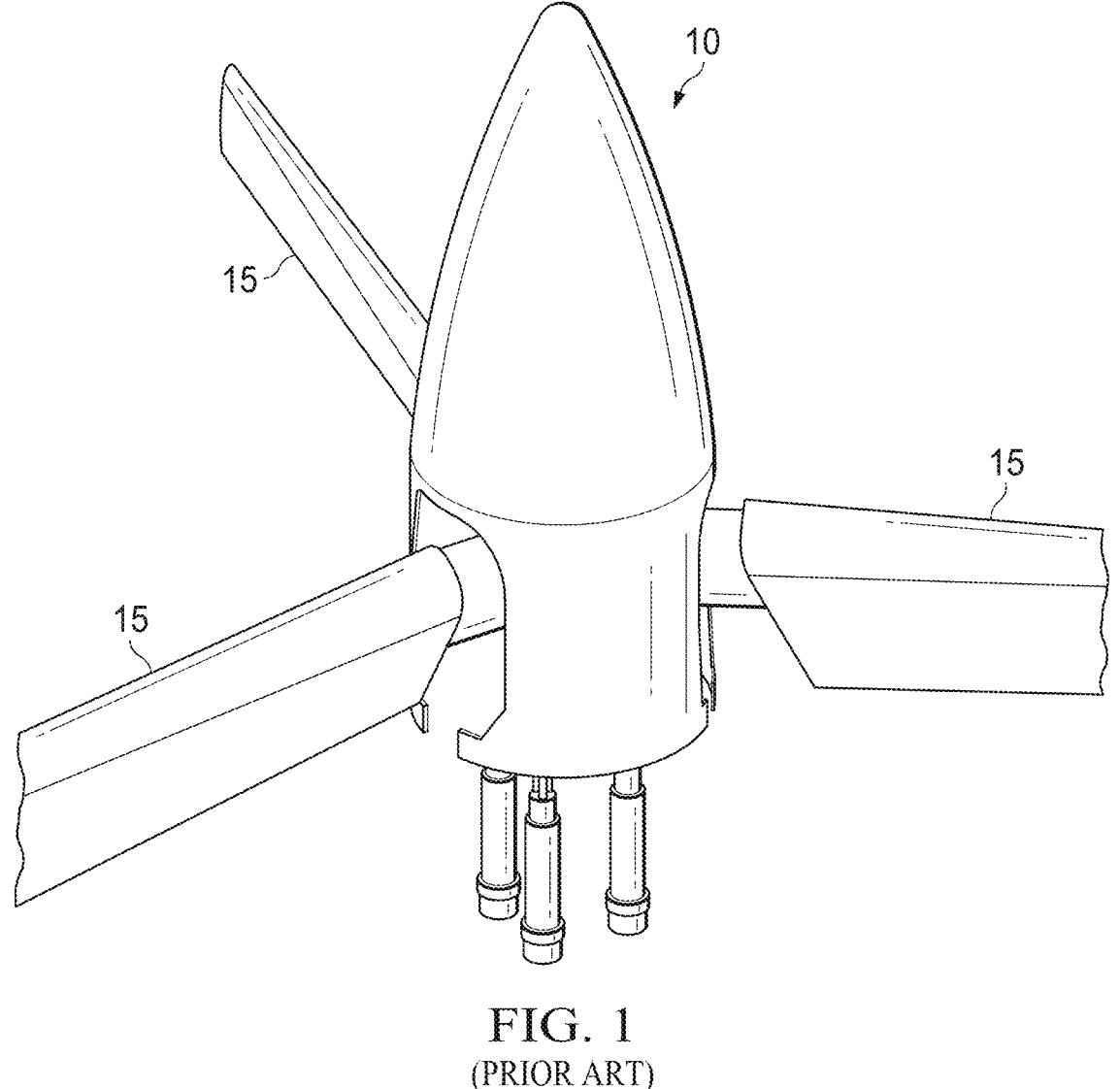
FIG. 1 is a prior art spinner embodiment.

FIG. 1 shows a prior art spinner. Spinner 10 is conical, extending downward into a tubular shape. Blades 15 extend out from the hub (not shown). Prior art spinners can reduce drag on an airplane/conventional tiltrotor that has a spinning hub and set of blades. By creating a slipstreamed shape that is a body of revolution over the very irregular mechanisms and components of the blade attachment, drag is greatly reduced on the overall aircraft.

There are various VTOL aircraft. A tilt rotor aircraft can tilt its rotors forward and the rotors are used to provide forward propulsion. A stop fold rotor aircraft can similarly tilt its rotors forward, but the rotor rotation is stopped and the blades are subsequently folded parallel to the axis of rotation, not allowed to spin, and forward propulsion is provided by other means, such as jet engines. Rotors, rotor apparatus, or rotor assembly, generally refers to the entire componentry comprising blades, the hub and actuators and connecting and adjusting means for the rotor. The hub is the primary structure that couples the plurality of spinning blades to the torque-applying mast.

Figure 2:
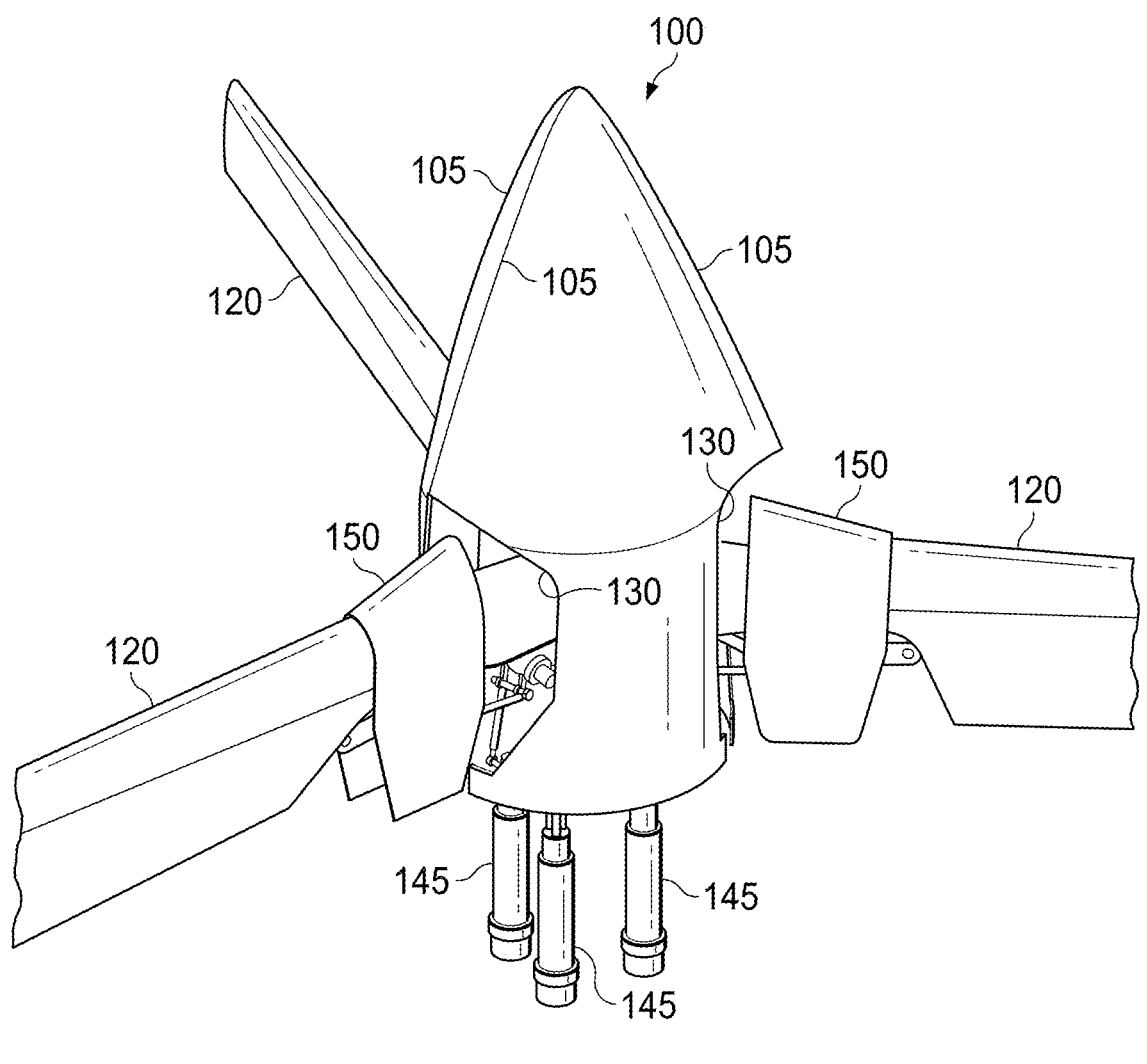
FIG. 2 is a spinner embodiment under the present disclosure.

Referring now to FIG. 2, a drag reducing spinner for a high-speed stop fold rotor aircraft can be seen. Spinner 100 can house portions of the rotor assembly, including the hub (not shown) that connects to blades 120. Cutouts 130 in spinner 100 allow blades 120 to extend out from the rotor. Fairings 150 provide protection for components of blades 120 and allow blades 120 to rotate downward so as to minimize drag during forward flight. Actuators 145 connect to swashplates (not shown) to adjust blades 120, such as adjusting pitch angle (feathering) and other settings of the hubs and or blades 120. Cutouts 130 surround each blade 120 and faring 150. Cutouts 130 are carefully sized and shaped to provide minimum effective clearance to the blades 120, grips, and fold components throughout their articulated motions during operation. This includes flapping, feathering, lead/lag, and fold motion. Spinner 100 houses other components of the rotors, such as swashplates, actuators, and other components. During forward flight, the blades 120 can be rotated downward (in this view) to rest against a pylon, rotor body, wing or other aircraft component. When folded, due to drastically reduced projected frontal area and induced drag from a thrust-generating rotor, the blade 120 and rotor apparatus will create significantly less drag compared to extended blades or other spinner embodiments, allowing for greater speed when compared to traditional tilt rotor aircraft. In addition to providing a more aerodynamic face, spinner 100 also provides protection for components within the general rotor apparatus. By maximally shielding the rotor assembly from high freestream velocities, foreign object damage (FOD) impacts as well as vibratory induced fatigue damage would be reduced. Chines 105 can comprise seems or edges for joining together the faces of spinner 100.

Figure 3:
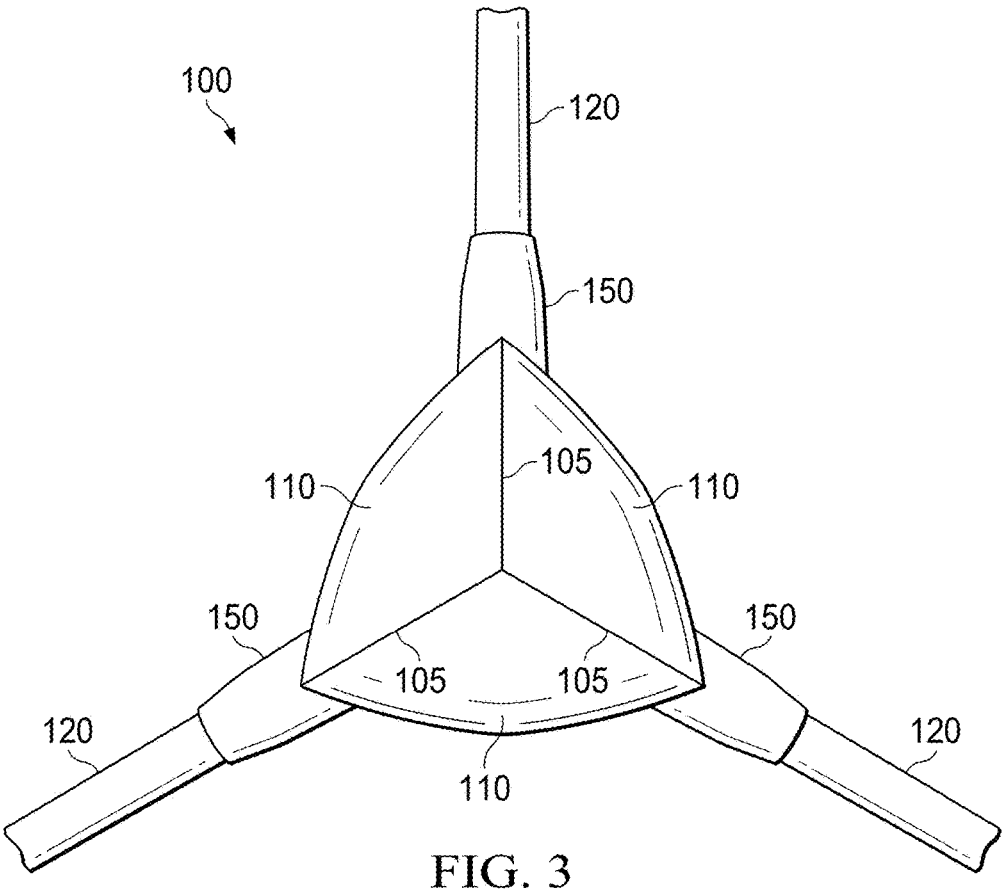
FIG. 3 is a spinner embodiment under the present disclosure.

FIG. 3 shows a similar embodiment to FIG. 2, but with a top-down view of spinner 100. In this embodiment spinner 100 comprises three faces 110, meeting at chines 105. Cutouts allows blades 120 to extend outward from spinner 100. Joints that allow blades 120 to fold toward the aircraft pylon or body, and other attachment components between blades 120 and the rotor, are at least partially covered by fairings 150.

Figure 4:
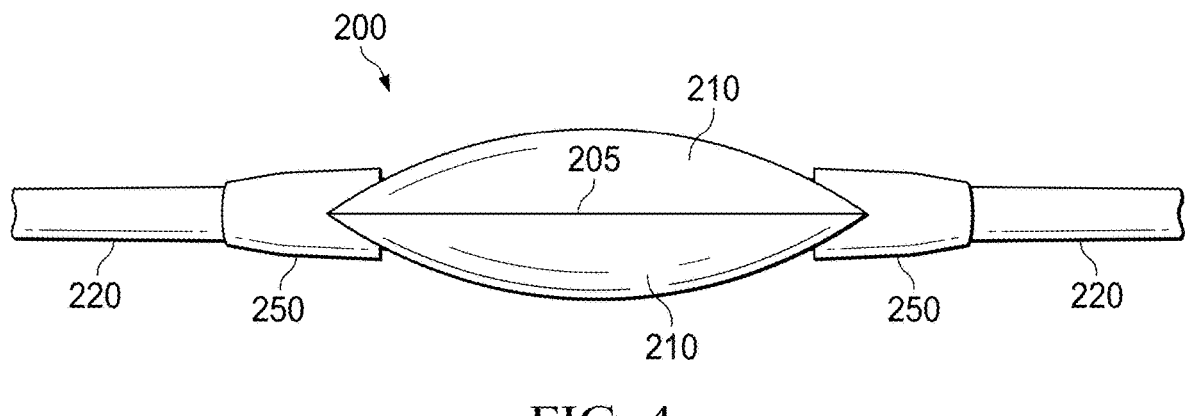
FIG. 4 is a spinner embodiment under the present disclosure.

While FIGS. 1 and 2 show a three-face embodiment of spinner 100, other embodiments are possible. For example, a two-face embodiment could be used for a rotor with two blades, such as in FIG. 4. Spinner 200 has two faces 210, with chines 205 between them. Chines 205 extend upward to a point and meet at the point. Fairings 250 extend outward from cutouts (not shown) to protect components near the base of blades 220. Other embodiments are possible with any desired number of faces. There will typically be one face per blade on a given hub. Two and three blade embodiments are the most common in the aerospace industry. In preferred embodiments, a chine or edge can extend from the middle of the spinner along an axis that is generally aligned parallel with each blade.

Figure 5A:
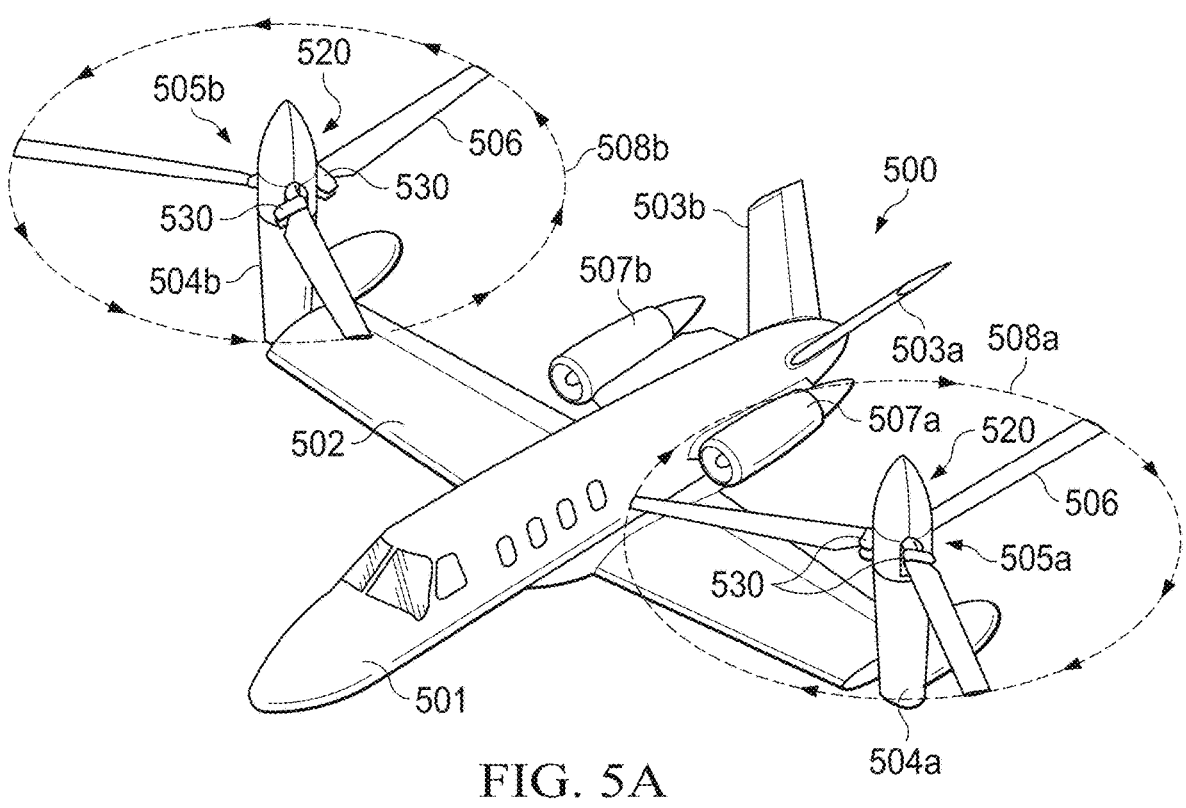
FIGS. 5A-5C is an aircraft embodiment under the present disclosure.
Figure 5B:
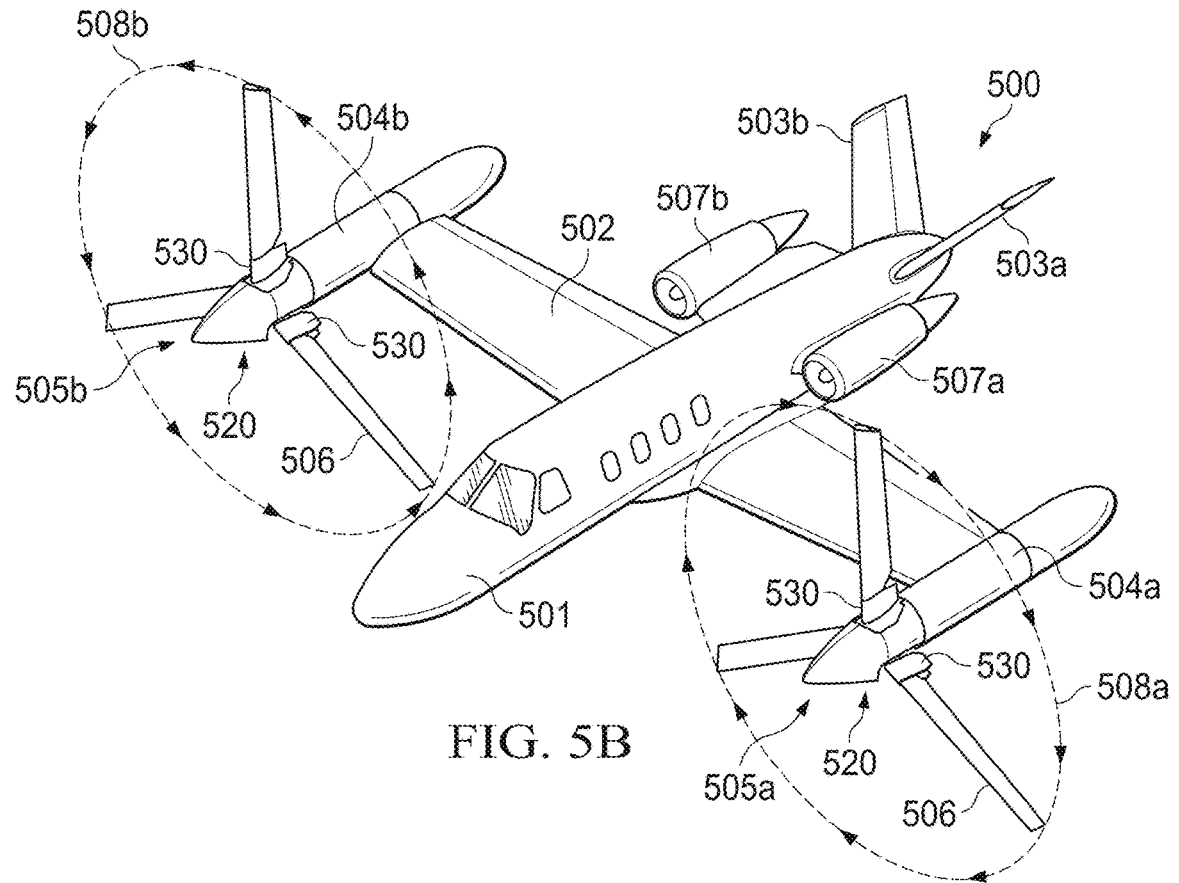
Figure 5C:
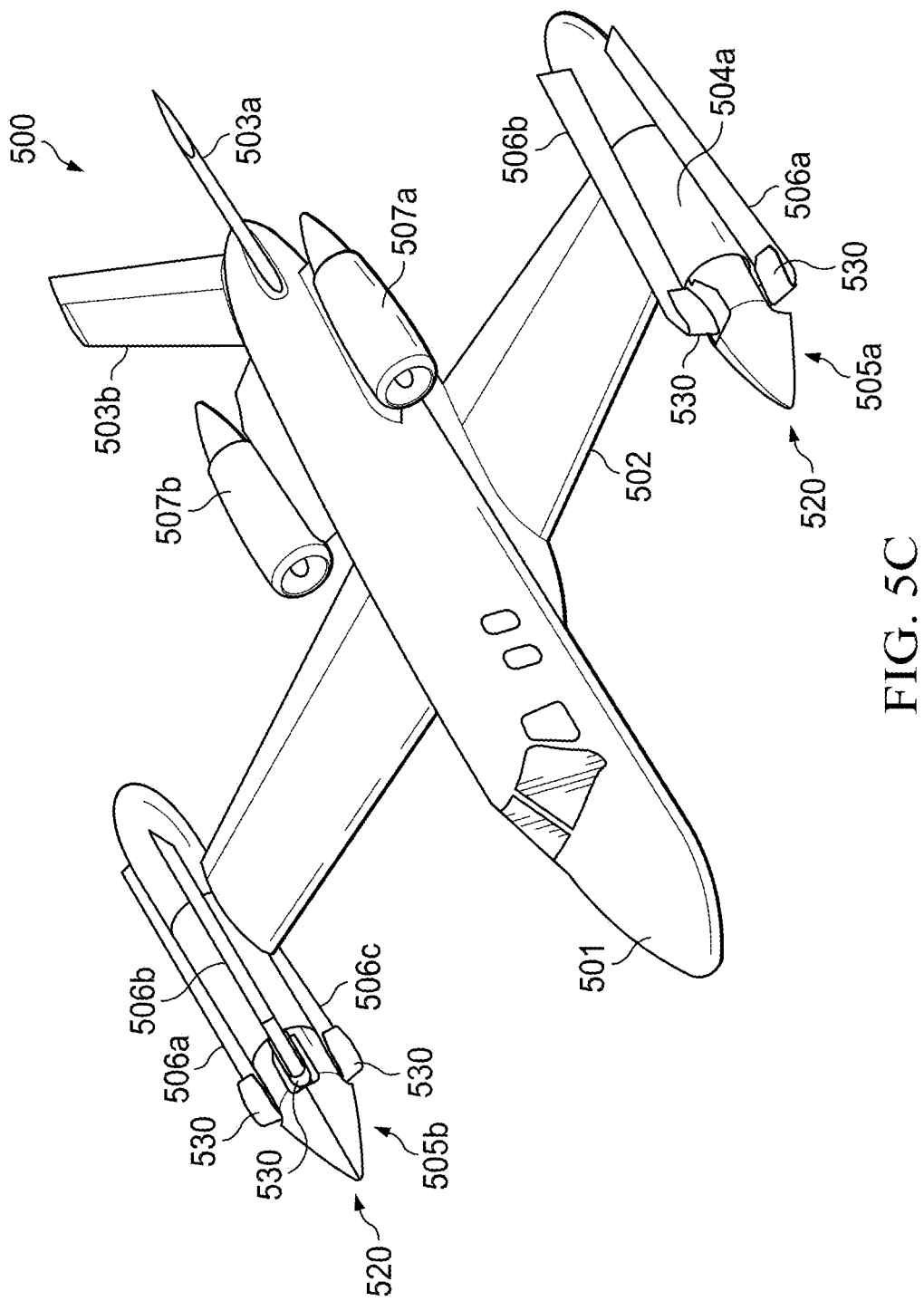

Referring to FIGS. 5A-5C, an aircraft embodiment 500 can be seen. Stop fold rotor aircraft 500 comprises a fuselage 501, a wing 502 and tail assemblies 503a, 503b. Tail assemblies 503a/b can include control surfaces, including ailerons, flaps, slats, spoilers, elevators, rudders, or rudder-vators, for assisting in horizontal and/or vertical stabilization during flight. Pylon assemblies 504a, 504b are disposed at the outboard ends of wing 502 and are rotatable between a generally vertical orientation (FIG. 5A), and a generally horizontal orientation (FIGS. 5B-5C). Pylon assemblies 504a, 504b may comprise a fixed portion that is attached to wing 502 and a moveable portion that rotates or pivots relative to wing 502, as illustrated in FIG. 5A (the fixed portion being aft of the moveable portion). In other embodiments, the entire pylon assemblies 504a, 504b may rotate relative to wing 502. In other embodiments, there may be additional tilt rotors, possibly located on additional wings. Tilt rotors can also be located mid-wing in some embodiments.

Spinners 520 can be seen on the top of rotor assemblies 505a, 505b and pylon assemblies 504a, 504b. Spinners 520 can comprise embodiments such as described in FIGS. 2-4. Pylon assemblies 504a, 504b can house components of a drive system used to rotate rotor assemblies 505a, 505b. A drive system may comprise, for example, engines or other gearing within pylon assemblies 504a, 504b. Alternatively, a separate drive system, such as engines 507a, 507b, may be coupled to rotor assemblies 505a, 505b via linkages in wing 502 and pylon assemblies 504a, 504b. Each rotor assembly 505a, 505b includes a plurality of blades 506 that are operable to be rotated, operable to be feathered, and operable to be folded such as in FIG. 5C.

Engines 507a, 507b can be located on the aft portion of fuselage 501. Engines 507a, 507b may be operable in a turboshaft mode, such as in FIGS. 5A and 5B, in which they provide torque and rotational energy to rotor assembly 505a, 505b, respectively. Alternatively, engines 507a, 507b may be operable in a turbofan mode, such as in FIG. 5C, in which they provide a rearward-directed thrust to propel aircraft 500.

FIG. 5A illustrates aircraft 500 in helicopter flight mode, in which rotor assemblies 505a, 505b rotate in a generally horizontal plane to provide lift. In this mode, engines 507a, 507*b* can operate in turboshaft mode wherein combustion gases in each engine 507*a*, 507*b* cause rotation of a turbine coupled to an output shaft that can be used to power the drive system coupled to the respective proprotor assemblies 505*a*, 505*b*. In this configuration, engines 507*a*, 507*b* are operable in the turboshaft mode and aircraft 500 is considered to be in the rotary flight mode. FIG. 5B illustrates aircraft 500 in rotor forward flight mode, in which rotor assemblies 505*a*, 505*b* are rotating in a generally vertical plane to provide a forward thrust and thereby enabling wing 502 to provide a lifting force responsive to forward airspeed, such that aircraft 500 can fly like a conventional propeller driven aircraft.

During rotary flight mode, proprotor assemblies 505*a*, 505*b* can rotate in opposite directions to provide torque balancing to aircraft 500. In the illustrated embodiment, rotor assemblies 505*a*, 505*b* each include three blades 506 that can be equally spaced apart circumferentially at approximately 120-degree intervals. It should be understood by those with ordinary skill in the art that the rotor assemblies 505*a*, 505*b* of the present disclosure may have blades with other designs and other configurations including, for example, four, five or more rotor blades. In addition, aircraft 500 can be operated such that rotor assemblies 505*a*, 505*b* are selectively positioned between rotor forward flight mode and helicopter mode, which can be referred to as a conversion flight mode.

FIG. 5C illustrates aircraft 500 in airplane forward flight mode, in which blades 506*a/b/c* of rotor assemblies 505*a*, 505*b* have been folded to be oriented generally parallel to pylon assemblies 504*a*, 504*b*. This configuration minimizes the drag force generated by rotor blades 506*a/b/c*. Spinners 520 and fairings 530 provide increased aerodynamic performance (reduced drag) over prior art spinners, in addition to protecting components within rotor assemblies 505*a*, 505*b* and pylon assemblies 504*a*, 504*b*. In this configuration, engines 507*a*, 507*b* are operable in the turbofan mode and aircraft 500 is considered to be in the non-rotary flight mode. The forward cruising speed of aircraft 500 can be significantly higher in airplane flight mode versus rotor flight mode as the airspeed-induced rotor aeroelastic instability is overcome. The spinners described herein, and their reduced drag, and protection for componentry, allow even greater speed.

Aircraft 500 may also transition from the configuration of FIG. 5C back to rotor flight by slowing below a maximum airspeed for rotor deployment. Blades 506*a/b/c* may then be swept forward and locked into place. Engines 507*a*, 507*b* may again be engaged with rotor assemblies 505*a*, 505*b*. When torque power is applied to rotate proprotor blades 506, aircraft 500 enters rotor forward flight mode. Aircraft 500 may then transition to conversion flight mode and/or helicopter flight mode by rotating rotor assembly 505*a*, 505*b* on pylon assemblies 504*a*, 504*b* from a horizontal orientation (FIG. 5B/5C) to a vertical orientation (FIG. 5A). In some embodiments, it may be desirable, during forward flight mode, to leave one blade 506*a* extended outward. This can create an even longer wing and may help in provide increased upward thrust.

Aircraft 500 has been described above comprising two engines fixed to the fuselage wherein each engine operates one of the rotor assemblies in rotary flight mode. It should be understood by those having ordinary skill in the art that other engine arrangements are possible and are considered to be within the scope of the present disclosure. For example, other embodiments of aircraft 500 may have a single engine that provides torque and rotational energy to both rotor assemblies 505*a*, 505*b*. In addition, even though rotor assemblies 505*a*, 505*b* are illustrated in the context of tiltrotor aircraft 500, it should be understood by those having ordinary skill in the art that the rotor assemblies disclosed herein can be implemented on other tiltrotor aircraft having multiple wing members 502 and other rotor assembly configurations.

Figure 6:
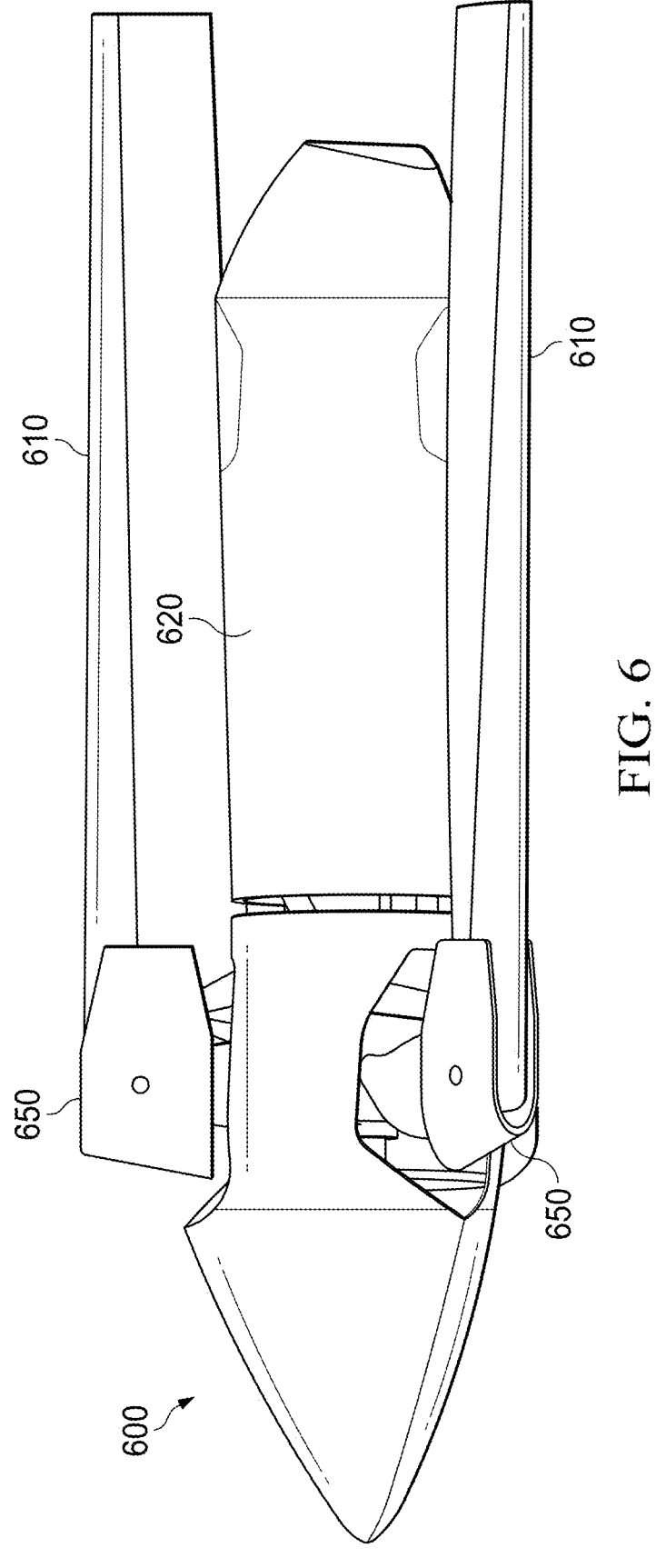
FIG. 6 is a spinner and pylon embodiment under the present disclosure.

FIG. 6 shows a pylon assembly 620 and spinner 600 with blades 610 in nested positions. Pylon assembly 620 can comprise similar components and functionality as described with regards to FIGS. 5A-5C. In the embodiment of FIG. 6, pylon assembly 620 does not have a fixed and moveable portion. Pylon assembly 620 would preferably be disposed at the end of a wing and would rotate up and down when moving between vertical and forward flight. Spinner 600 can comprise an attachment to pylon assembly 620, such as bolts, interference fit, adhesives, locking parts, sauntering, molding or other means. In some cases the faces of the spinner 600, and/or the pylon assembly, or substantial portions of these components, can have unitary construction. During forward flight, spinner 600 and fairings 650 provide protection to blades 610 and reduce drag.

Figure 7A:
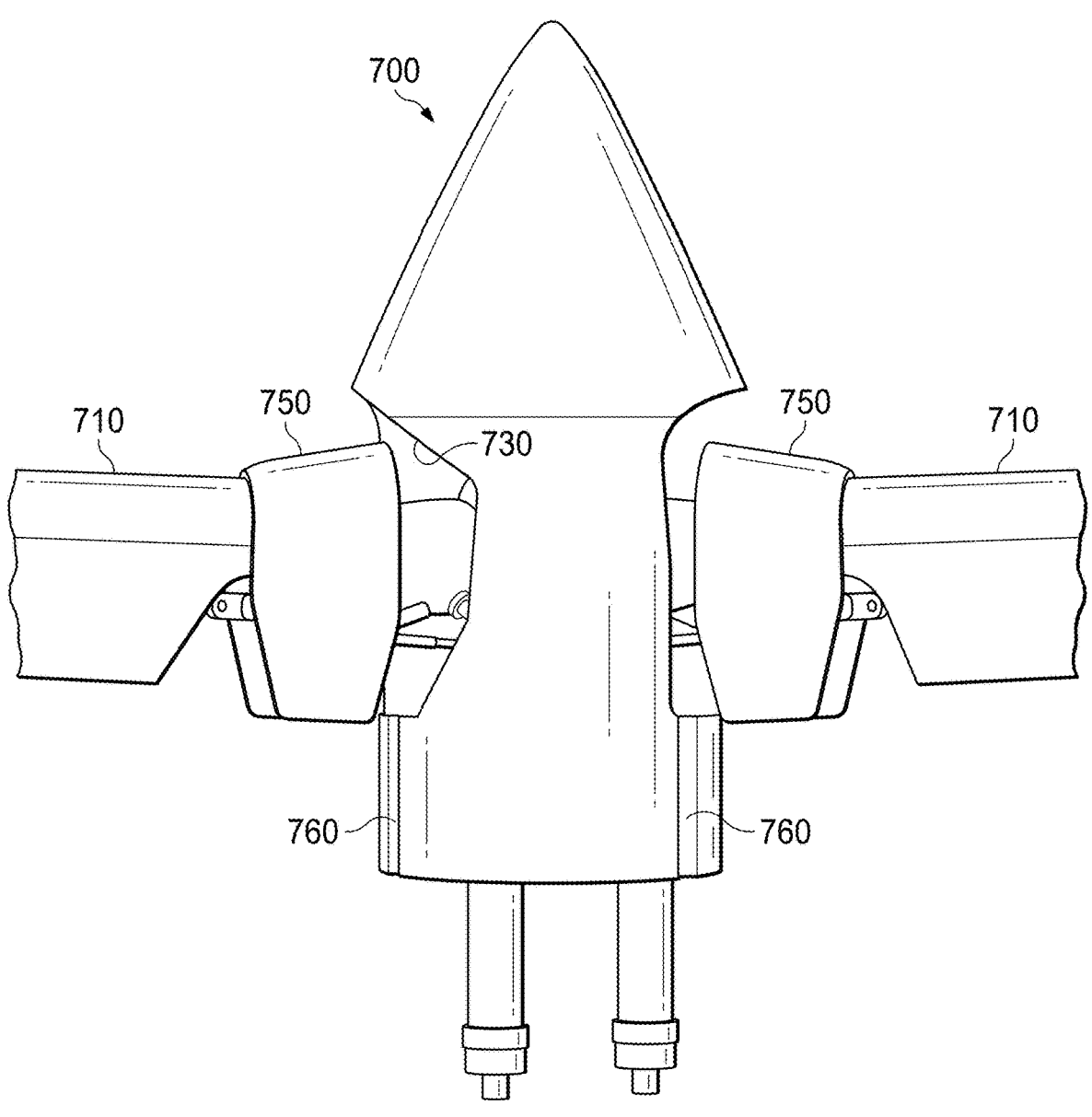
FIGS. 7A-7C is a spinner and pylon embodiment under the present disclosure.
Figure 7B:
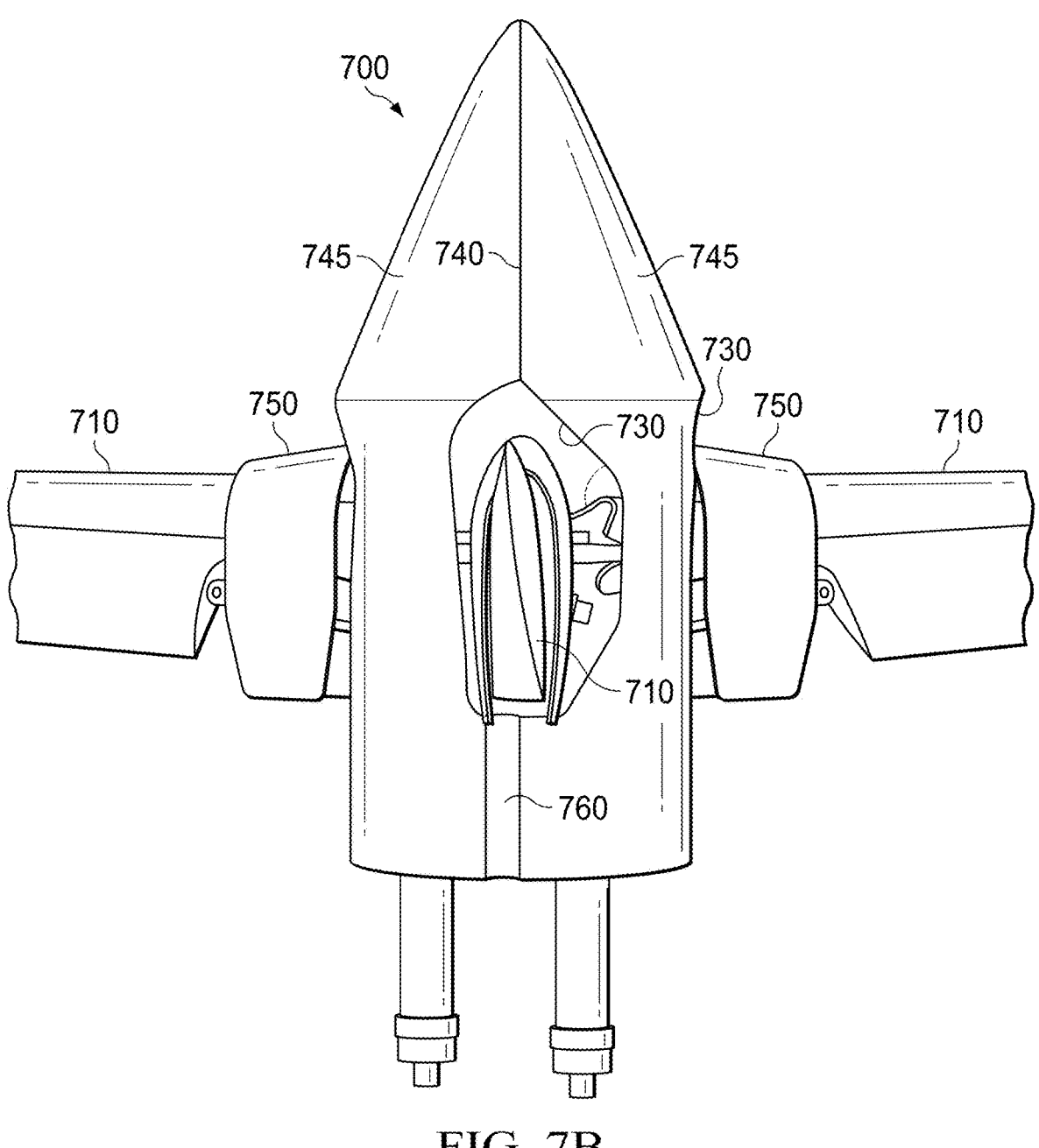
Figure 7C:
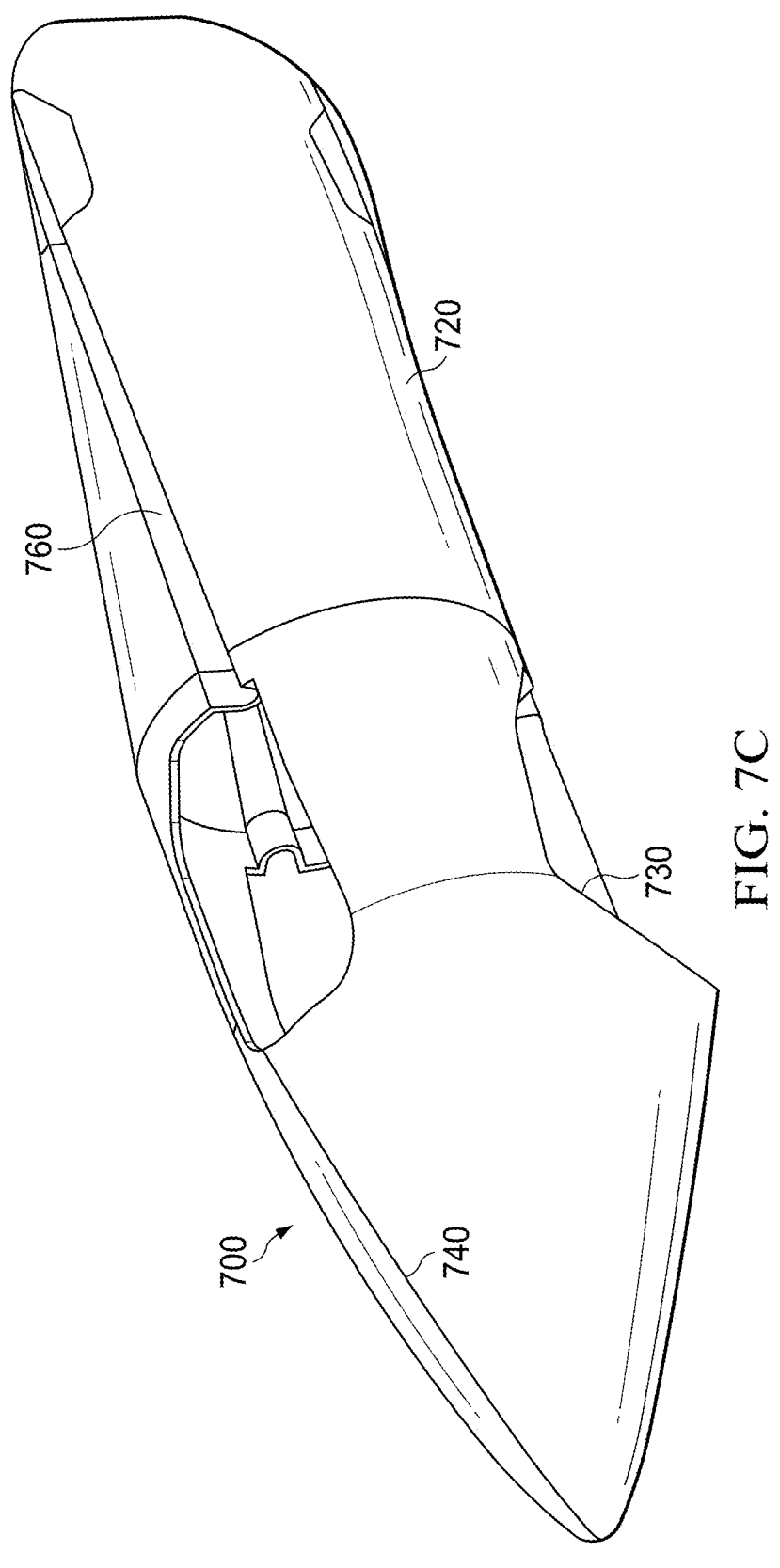

To assist in the nesting of blades, a nesting channel is preferred to secure the blade place along the spinner body and pylon assembly. Nesting channels 760 can be seen in FIGS. 7A-7C. Spinner 700 comprises cutouts 730 for blades 710 and fairings 750. Chine 740 distinguishes the faces 745 of spinner 700. Nesting channels 760 provide a place for an edge of blades 710 to rest during forward flight or when the blades are otherwise folded down along the sides of spinner 700 and pylon assembly 720. As shown in FIG. 7C, nesting channel 760 can extend from spinner 700 down along pylon assembly 720.

Figure 8:
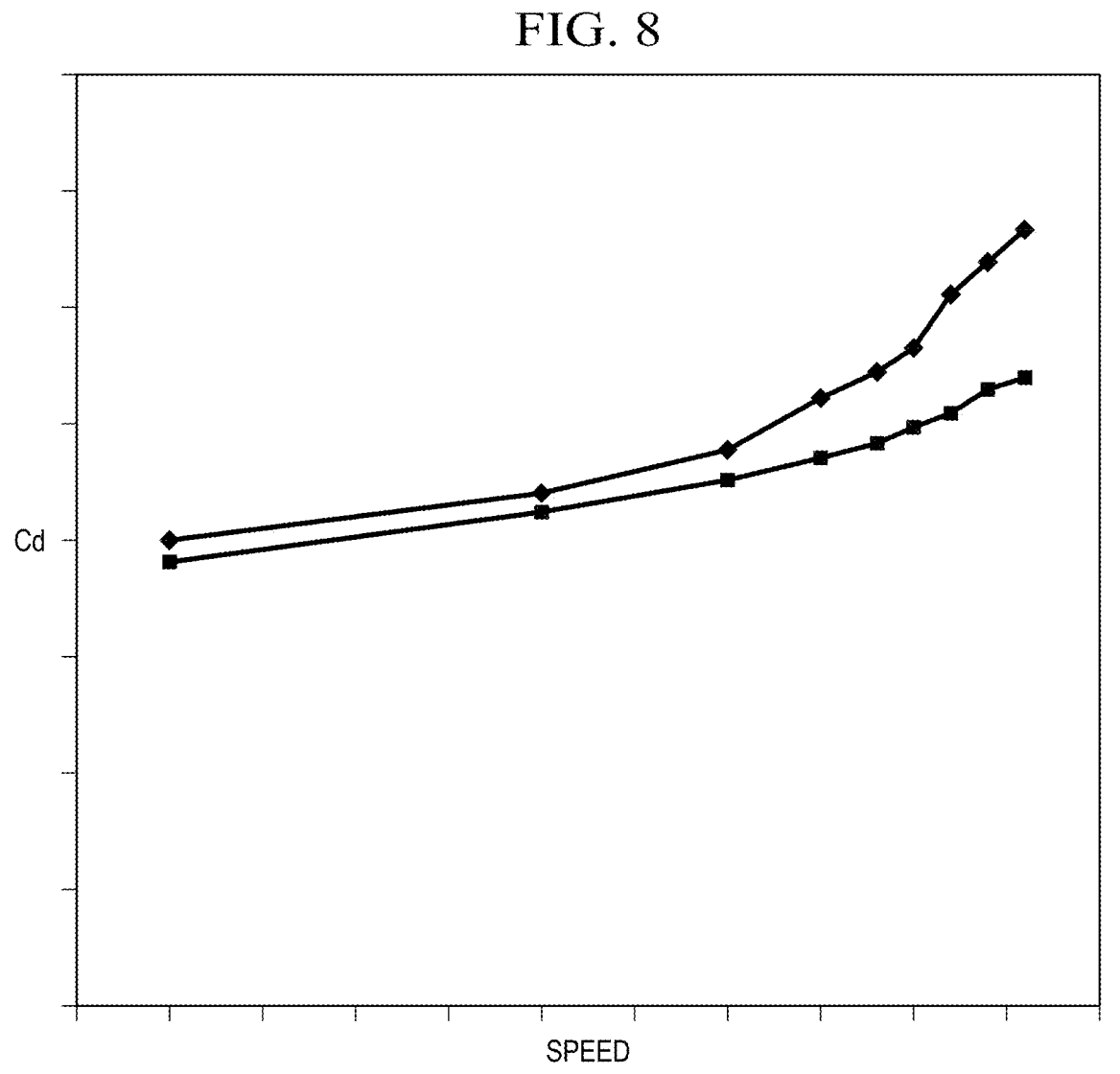

As described above, the drag reducing spinner of the current disclosure reduces drag on tilt rotor aircraft during flight. Results from experiments of the described spinners can be seen in FIG. 8. FIG. 8 shows a graph of drag coefficient vs speed. The top line shows drag with a conventional spinner for a tilt rotor aircraft. The bottom line, with reduced drag, shows embodiments of tilt rotor aircraft with spinners under the current disclosure.

Figure 9:
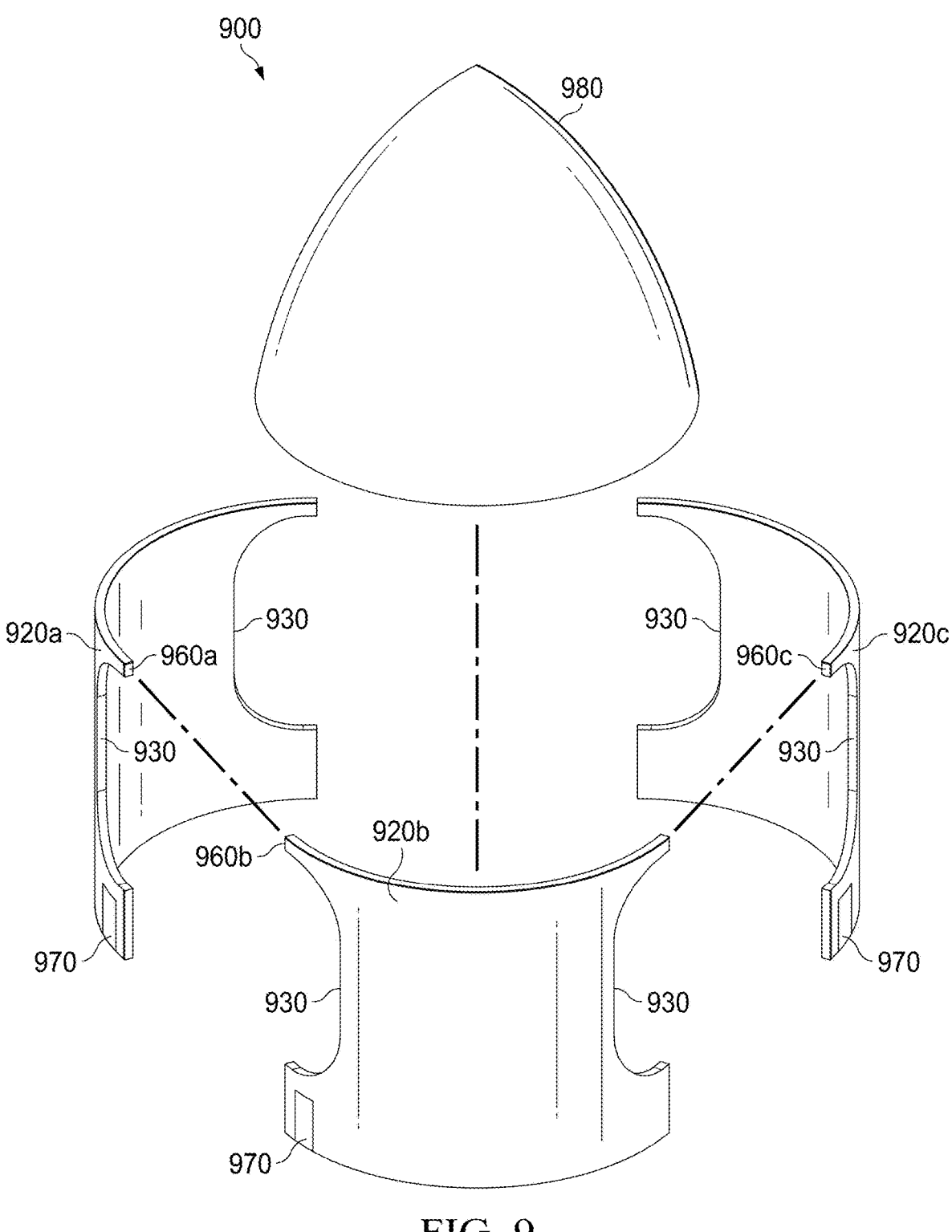
FIG. 9 is a spinner embodiment under the present disclosure.

FIG. 9 shows an exploded view of a possible spinner 900 embodiment. In this embodiment there are three faces 920*a/b/c*. Cutouts 930 can be seen, such as described above. Recesses 970 can hold a blade in place when folded down. Flanges 960*a/b/c* can be seen. When faces 920*a/b/c* are joined together the flanges 960*a/b/c* can fit underneath the neighboring face 920*a/b/c*. For example, flange 920*c* will fit to the underside of face 920*b*. Flange 920*b* can engage the rear of face 920*a*, and so on. There can be a flange on the underside of each face 920*a/b/c* to couple with flanges 960*a/b/c*. Or flanges 960*a/b/c* can engage the back surface of face 920*a/b/c*. Coupling can be done with welding, soldering, bolts, screws, adhesives, or other attachments means, or combinations of attachment means. Joining faces 920*a/b/c* together can create the chines and edges between faces as described above. The embodiment of spinner 900 shows multiple components. Top portion 980 can be attached to the top of faces 920*a/b/c*. Attachment can be by any means described in relation to the joining/attachment of the faces 920*a/b/c*. It may be desirable in some embodiments for faces 920*a/b/c*, top portion 980, or combinations thereof, to have a unibody construction. In some embodiments, the faces 920*a/b/c* may join at the top in a point, meaning that a separate top portion 980 is not needed.

Materials for spinners as described herein are preferably sheet metal, composites, thin laminate composites, or other materials with desired weight and strength characteristics depending on the aircraft embodiment. A single spinner can comprise components of different materials.

FIG. 10 illustrates a manufacturing method 1000 embodiment under the present disclosure. Step 1010 is to provide a top portion comprising a top point and a bottom opening. Step 1020 is to provide two or more spinner faces, each comprising first and second cutouts on distal lateral edges and configured to connect to the bottom opening when all of the two or more spinner faces are joined together. Step 1030 is to join the two or more spinner faces together along the lateral edges comprising the first and second cutouts such that neighboring first and second cutouts combine to form a plurality of blade openings and the two or more spinner faces form a hub opening on the bottom that is configured to receive at least a portion of a rotor. Step 1040 is to join the two or more spinner faces to the bottom opening.

FIG. 11 illustrates a manufacturing method 1100 embodiment under the present disclosure. At step 1110, a cone-shaped spinner is provided for a tilt rotor aircraft. This can be formed with sheet metal, composite, or other materials. At step 1120, a plurality of faces is formed in the spinner, the plurality of faces separated by a plurality of chines. At step 1130, a blade opening is cut along each of the plurality of chines, wherein the cutting removes a portion of each face connected at each chine.

FIG. 12 shows another possible method embodiment under the present disclosure. Method 1200 is a method of operating a stop fold rotor aircraft. Step 1210 is to direct stop fold rotors in a generally vertical position. Step 1220 is to use spinning stop fold rotors to provide vertical thrust and lift the aircraft, wherein the stop fold rotors comprise a spinner comprising; a top portion comprising a point and an opening; two or more faces, the two or more faces joined on their lateral edges and configured to connect to the opening of the top portion at their top edges, and configured to form an opening at a distal end, the opening configured to receive at least a portion of a rotor hub therethrough; two or more chines, each defining a border between two of the two or more faces; a blade cutout along each chine, each blade cutout configured to allow for coupling between a rotor hub and a rotor blade therethrough; and two or more fairings, each of the two or more fairings configured to extend from the blade cutout and cover at least a portion of a rotor blade. Step 1230 is to tilt the stop fold rotors forward to begin forward flight. Step 1240 is to provide power to jet engine to increase forward flight speed. Step 1250 is to stop the rotors in place. Step 1260 is to fold rotor blades along a portion of the spinners and generally parallel to the previous axis of rotation, such that the spinner provides aerodynamic benefits during forward flight.

The chines, top points, and faces of the spinner embodiments described herein can be adjusted to achieve improved low electromagnetic observability effects. Some aircraft embodiments may aim to achieve low observability capabilities. Adjusting the exact angles of the faces, tops and chines may allow for these benefits, in contrast to the traditional spinner body of revolution shape. The angles and shapes necessary for low observability may depend on other measurements and angles used in a given aircraft, and may also depend on expected flight altitude.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A spinner for an aircraft, comprising:

two or more faces, the two or more faces joined on their lateral edges and configured to come together at a point on a first end and configured to form an opening at a distal end, the opening configured to receive at least a portion of a rotor hub therethrough, wherein each of the two or more faces is non-undulating;

two or more chines, each defining a border between two of the two or more faces and each defining an edge that forms a discontinuity between the two of the two or more faces; and a blade cutout along each chine, each blade cutout configured to allow for coupling between a rotor hub and a rotor blade therethrough, wherein each of the two or more chines extends from the point to the blade cutout.

2. The spinner of claim 1 further comprising two or more fairings, each of the two or more fairings configured to cover the coupling between the rotor hub and the rotor blade.

3. The spinner of claim 1 further comprising two or more recesses configured to receive an edge of a rotor blade during forward flight.

4. The spinner of claim 1 wherein the two or more faces are joined together by welding at each chine.

5. The spinner of claim 1 wherein the blade cutout is nonuniform about the chine.

6. The spinner of claim 1 wherein the spinner comprises a thin laminate composite.

7. The spinner of claim 1 wherein the spinner comprises a sheet metal.

8. The spinner of claim 1 wherein the opening is configured to be attached to a pylon assembly.

9. An aircraft, comprising:

a fuselage;

a wing coupled to the fuselage; and one or more stop rotors coupled to the wing, each stop rotor operable to provide vertical thrust when in a generally vertical orientation and further operable to be maneuvered to a generally horizontal direction during forward flight, each of the one or more stop rotors comprising;

one or more rotor blades; and a spinner coupled to a top of each of the one or more stop rotors, each spinner comprising;

two or more faces, the two or more faces joined along their lateral edges and configured to come together at a point on a first end and configured to form an opening at a distal end, the opening receiving at least a portion of a respective one of the one or more stop rotors therethrough, wherein each of the two or more faces is non-undulating;

two or more chines, each defining a border between two of the two or more faces; and a blade cutout along each chine, each blade cutout configured to allow for coupling between one of the one or more stop rotors and one of the one or more rotor blades therethrough, wherein each of the two or more chines extends from the point to the blade cutout.

10. The aircraft of claim 9 wherein the two or more faces are joined at the two or more chines by a plurality of bolts.

11. The aircraft of claim 9, wherein each spinner comprises a plurality of recesses configured to receive one of the one or more rotor blades.

12. The aircraft of claim 9 wherein each spinner is coupled to one or more fairings, each of the one or more fairings configured to extend outward from the spinner and cover at least a portion of one of the one or more rotor blades.

13. The aircraft of claim 9 wherein the two or more faces are joined at the two or more chines by welding.

14. The aircraft of claim 9 wherein each spinner comprises a composite material.

15. The aircraft of claim 9 wherein each blade cutout is sized to allow the one or more rotor blades to flap and adjust pitch angle during flight.

16. A method of manufacturing a spinner for an aircraft, comprising:

providing two or more spinner faces, the two or more spinner faces configured to be joined along lateral edges and to come together at a point on a first end and to form an opening distal to the point, wherein each of the two or more spinner faces is non-undulating;

joining the two or more spinner faces together along the lateral edges, each of the lateral edges comprising a chine that forms a discontinuity between the two or more spinner faces, and wherein the two or more spinner faces combine to form at least a portion of first and second cutouts such that neighboring first and second cutouts combine to form a plurality of blade openings configured to receive at least a portion of a blade therethrough, and wherein the opening distal to the point is configured to receive at least a portion of a rotor therethrough.

17. The method of claim 16 further comprising forming a recess in each of the two or more spinner faces configured to sit below the plurality of blade openings and configured to receive a blade edge during flight.

18. The method of claim 16 wherein the two or more spinner faces comprise two spinner faces.

19. The method of claim 17 wherein the two or more spinner faces comprise three spinner faces.

20. The method of claim 17 wherein the first and second cutouts are sized to allow one or more rotor blades to flap and adjust pitch angle during flight.

* * * * *